United States Patent
Oh et al.

(10) Patent No.: US 10,615,398 B2
(45) Date of Patent: Apr. 7, 2020

(54) ELECTRODE ASSEMBLY INCLUDING COUPLING PART BETWEEN ELECTRODE TABS AND ELECTRODE LEAD LOCATED IN SPACE PORTION

(71) Applicant: LG Chem, Ltd., Seoul (KR)

(72) Inventors: Sei Woon Oh, Daejeon (KR); Seong Yoon Lim, Daejeon (KR); Hyun Min Kim, Daejeon (KR); Jung Ah Shim, Daejeon (KR); Ho Sub Lee, Daejeon (KR); Jung Hwa Jung, Daejeon (KR)

(73) Assignee: LG Chem, Ltd. (KR)

(*) Notice: Subject to any disclaimer, the term of this patent is extended or adjusted under 35 U.S.C. 154(b) by 52 days.

(21) Appl. No.: 15/513,692

(22) PCT Filed: Jan. 28, 2016

(86) PCT No.: PCT/KR2016/000910
§ 371 (c)(1),
(2) Date: Mar. 23, 2017

(87) PCT Pub. No.: WO2016/167457
PCT Pub. Date: Oct. 20, 2016

(65) Prior Publication Data
US 2018/0026254 A1    Jan. 25, 2018

(30) Foreign Application Priority Data
Apr. 16, 2015 (KR) .......................... 10-2015-0053576

(51) Int. Cl.
H01M 2/26      (2006.01)
H01M 2/30      (2006.01)
(Continued)

(52) U.S. Cl.
CPC .............. *H01M 2/266* (2013.01); *H01M 2/10* (2013.01); *H01M 2/26* (2013.01); *H01M 2/30* (2013.01);
(Continued)

(58) Field of Classification Search
CPC .............. H01M 2/266; H01M 10/0585; H01M 10/0525; H01M 10/049; H01M 2/10;
(Continued)

(56) References Cited

U.S. PATENT DOCUMENTS

2010/0028770 A1    2/2010  Ryu et al.
2012/0015236 A1*   1/2012  Spare ................. H01M 2/0275
                                                        429/162
(Continued)

FOREIGN PATENT DOCUMENTS

JP    H08250103 A    9/1996
JP    2002298825 A   10/2002
(Continued)

OTHER PUBLICATIONS

Machine translation of KR 10-2003-0066960, Chang, 2003 (Year: 2003).*

(Continued)

*Primary Examiner* — Maria Laios
*Assistant Examiner* — Kwang Han
(74) *Attorney, Agent, or Firm* — Lerner, David, Littenberg, Krumholz & Mentlik, LLP

(57) ABSTRACT

Disclosed herein are an electrode assembly including a plurality of unit cells arranged in a height direction on the basis of a plane, at least two of the unit cells having different planar sizes, and a space portion defined by the difference in planar size between the arranged unit cells, wherein each of the unit cells includes at least one electrode plate, electrode tabs protruding from the electrode plates of the unit cells are
(Continued)

electrically connected to an electrode lead via a tab-lead coupling part, and the tab-lead coupling part is located in the space portion, and a battery cell including the same.

25 Claims, 4 Drawing Sheets

(51) Int. Cl.
*H01M 10/058* (2010.01)
*H01M 10/04* (2006.01)
*H01M 2/10* (2006.01)
*H01M 10/0525* (2010.01)
*H01M 10/0585* (2010.01)

(52) U.S. Cl.
CPC ......... *H01M 10/04* (2013.01); *H01M 10/049* (2013.01); *H01M 10/058* (2013.01); *H01M 10/0525* (2013.01); *H01M 10/0585* (2013.01); *H01M 2220/20* (2013.01); *H01M 2220/30* (2013.01)

(58) Field of Classification Search
CPC ...... H01M 10/058; H01M 10/04; H01M 2/30; H01M 2/26; H01M 2220/30; H01M 2220/20
See application file for complete search history.

(56) References Cited

U.S. PATENT DOCUMENTS

| | | | | |
|---|---|---|---|---|
| 2012/0121965 | A1* | 5/2012 | Makino | H01M 2/22 |
| | | | | 429/156 |
| 2014/0186685 | A1* | 7/2014 | Kwon | H01M 2/18 |
| | | | | 429/160 |
| 2015/0044536 | A1* | 2/2015 | Kwon | H01M 2/0207 |
| | | | | 429/94 |

FOREIGN PATENT DOCUMENTS

| | | | | |
|---|---|---|---|---|
| JP | 2007234466 A | 9/2007 | | |
| JP | 2008027891 A | 2/2008 | | |
| KR | 10-2003-0066960 | * | 8/2003 | ............ H01M 10/12 |
| KR | 20030066960 | * | 8/2003 | |
| KR | 20030066960 A | 8/2003 | | |
| KR | 101292998 B1 | 8/2013 | | |
| KR | 20130119700 A | 11/2013 | | |
| KR | 101348562 B1 | 1/2014 | | |
| KR | 1020140100032 A | 8/2014 | | |
| KR | 1020140114803 A | 9/2014 | | |

OTHER PUBLICATIONS

International Search Report for Application No. PCT/KR2016/000910 dated May 4, 2016.

* cited by examiner

【FIG. 1】
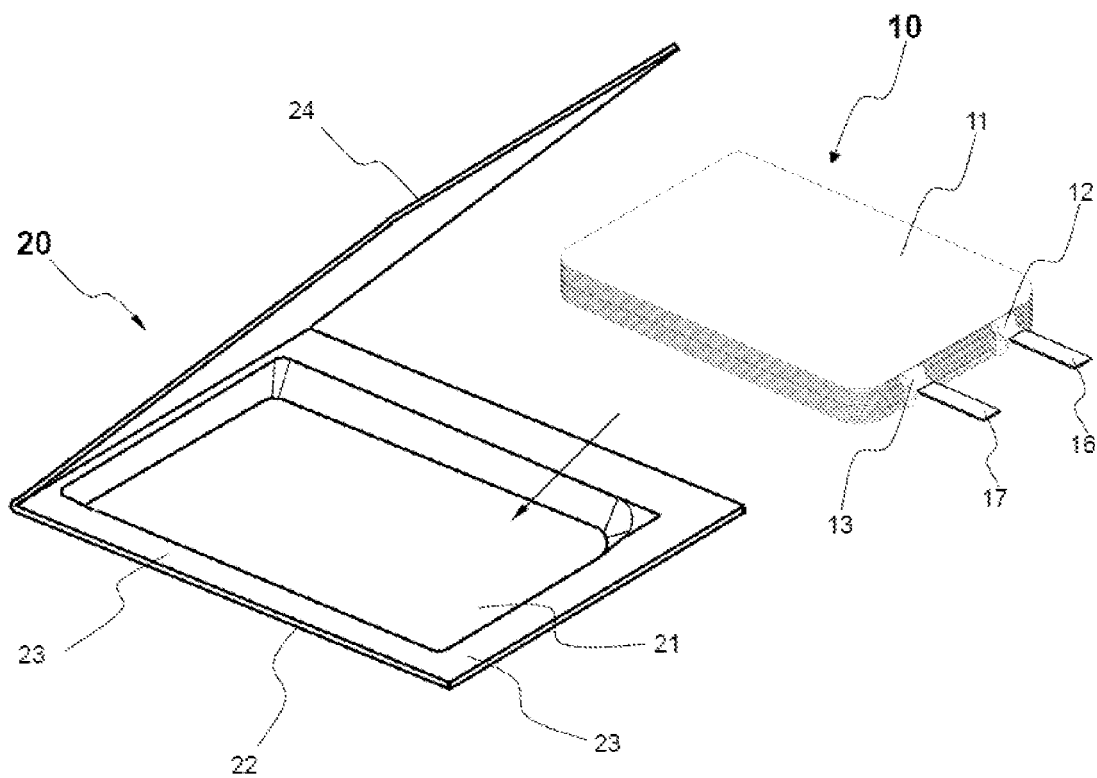
【FIG. 2】
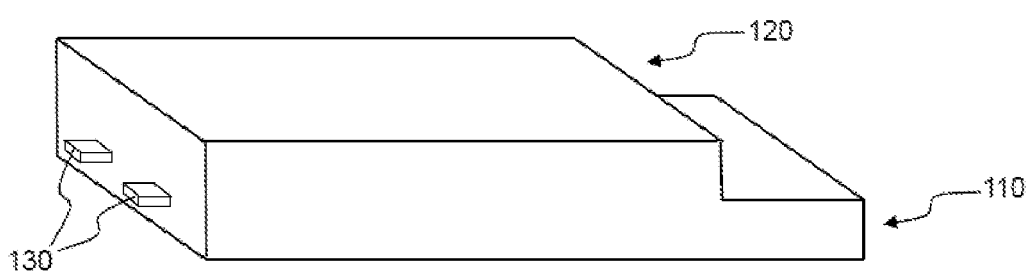

[FIG. 3]
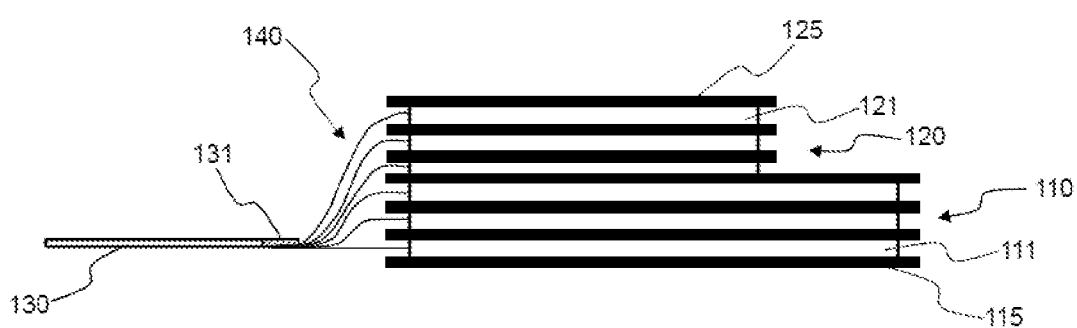
[FIG. 4]
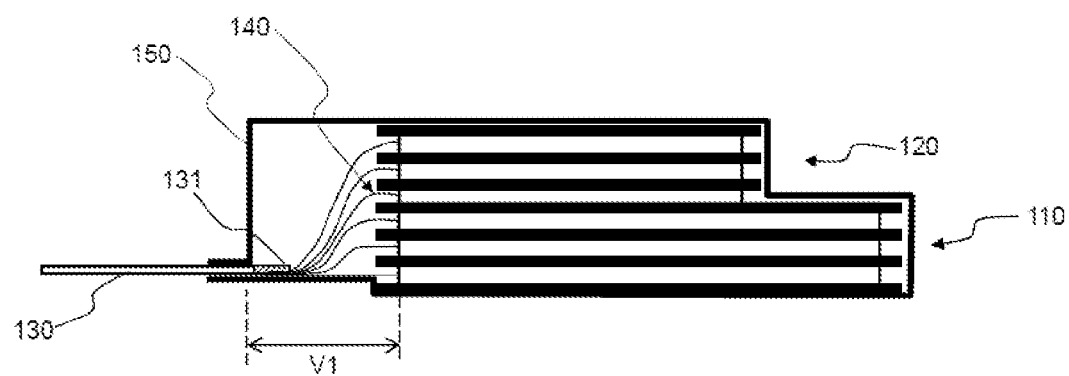

【FIG. 5】
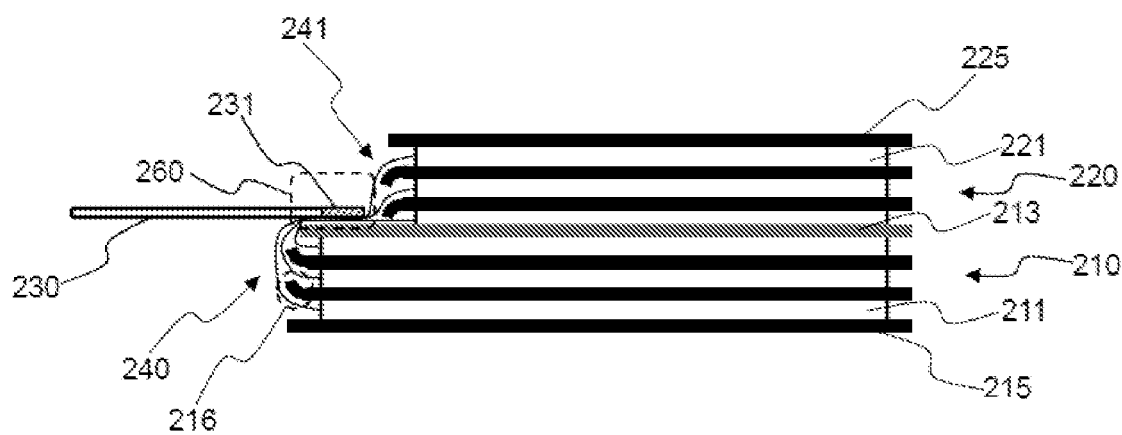
【FIG. 6】
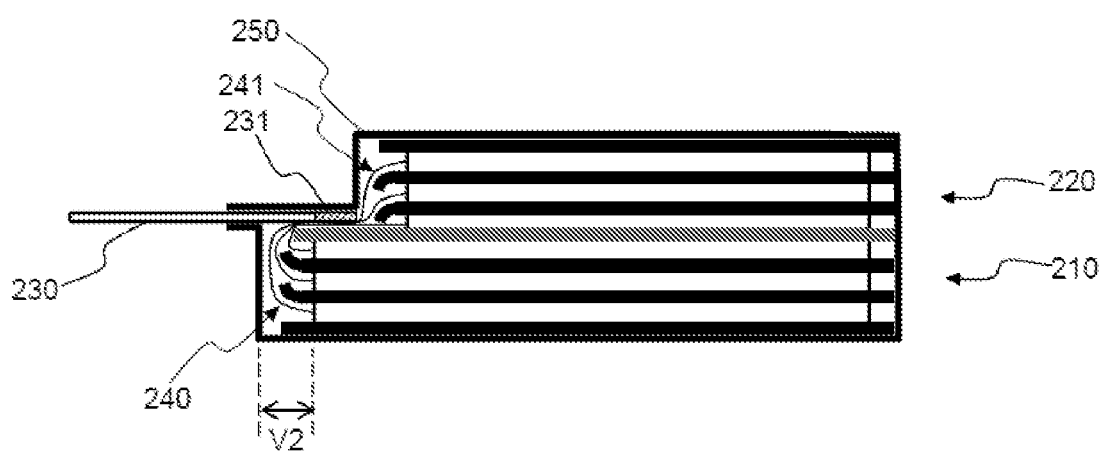

【FIG. 7】
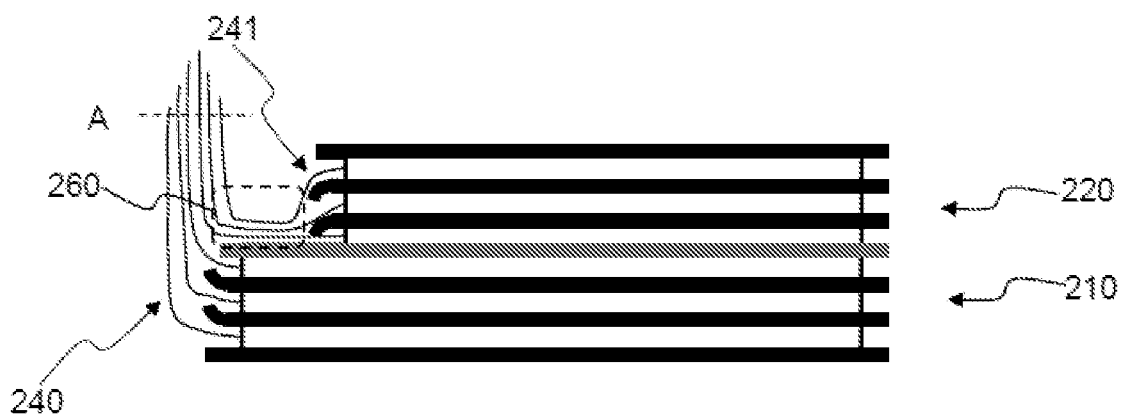
【FIG. 8】
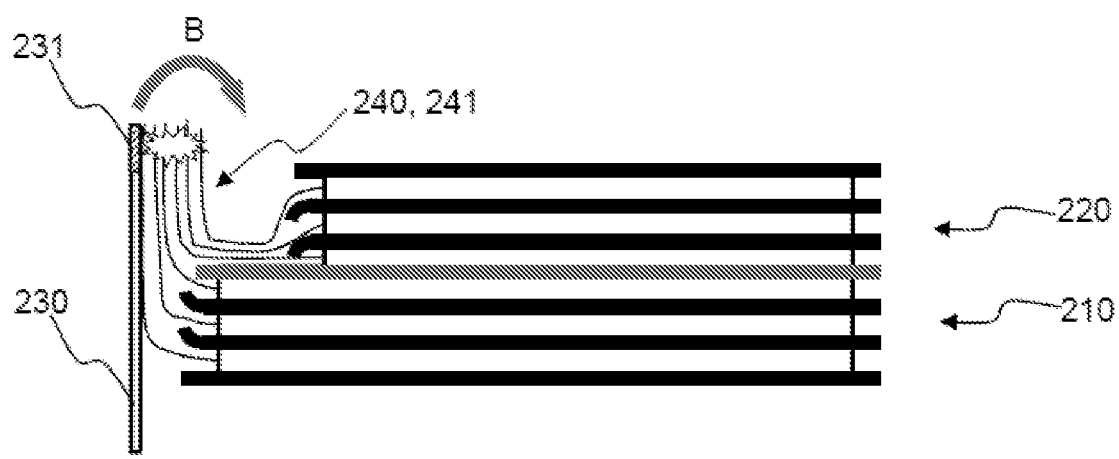

ELECTRODE ASSEMBLY INCLUDING COUPLING PART BETWEEN ELECTRODE TABS AND ELECTRODE LEAD LOCATED IN SPACE PORTION

CROSS-REFERENCE TO RELATED APPLICATIONS

The present application is a national phase entry under 35 U.S.C. § 371 of International Application No. PCT/KR2016/000910, filed Jan. 28, 2016, published in Korean, which claims the benefit of Korean Patent Application No. 10-2015-0053576 filed on Apr. 16, 2015, with the Korean Intellectual Property Office, the disclosures of which are herein incorporated by reference in their entirety.

TECHNICAL FIELD

The present invention relates to an electrode assembly including a coupling part between electrode tabs and an electrode lead located in a space portion.

BACKGROUND ART

The rapid increase in the use of fossil fuels has accelerated the demand for alternative energy sources or clean energy sources, and research has been actively carried out on power generation and power storage using electrochemistry.

A typical example of an electrochemical device using such electrochemical energy is a secondary battery, which has been increasingly used in various fields.

Based on the shape of a battery case, secondary batteries may be classified into a cylindrical battery having an electrode assembly mounted in a cylindrical metal can, a prismatic battery having an electrode assembly mounted in a prismatic metal can, and a pouch-shaped battery having an electrode assembly mounted in a pouch-shaped case made of an aluminum laminate sheet.

The electrode assembly mounted in the battery case functions as a power generating element, having a positive electrode/separator/negative electrode stack structure, which can be charged and discharged. The electrode assembly may be classified as a jelly-roll type electrode assembly configured to have a structure in which a long sheet type positive electrode and a long sheet type negative electrode, to which active materials are applied, are wound in a state in which a separator is disposed between the positive electrode and the negative electrode, or a stacked type electrode assembly configured to have a structure in which a plurality of positive electrodes having a predetermined size and a plurality of negative electrodes having a predetermined size are sequentially stacked in a state in which separators are disposed respectively between the positive electrodes and the negative electrodes.

As an electrode assembly with an improved structure, in which the jelly-roll type electrode assembly and the stacked type electrode assembly are combined, a stacked/folded type electrode assembly has been developed. The stacked/folded type electrode assembly is configured to have a structure in which a plurality of full cells, each of which has a predetermined size and is configured to have a positive electrode/separator/negative electrode structure, or a plurality of bicells, each of which has a predetermined size and is configured to have a positive electrode (negative electrode)/separator/negative electrode (positive electrode)/separator/positive electrode (negative electrode) structure, are folded using a long continuous separation film.

In addition, in order to improve the processability of a conventional stacked type electrode assembly and to satisfy the demand for various kinds of secondary batteries, there also has been developed a laminated/stacked type electrode assembly configured to have a structure in which unit cells, each of which includes electrodes and separators laminated in a state in which the electrodes and the separators are alternately arranged, are stacked.

Meanwhile, the demand for a lithium secondary battery, which is one of the types of the secondary battery, has increased since the lithium secondary battery is lighter than the other secondary batteries and has higher energy density than other secondary batteries. Even though consumers' demand for a battery having high energy density has steadily increased, the energy density of the lithium secondary battery is still not enough to satisfy the consumers' demand.

In order to solve the above problem, an attempt to increase the energy density using the space inside the secondary battery has been made. However, desired effects have not been achieved due to structural limitations of the secondary battery.

Particularly, in a battery configured to have a structure in which a plurality of electrode plates and a plurality of separators are stacked, many attempts has been made to reduce the volume occupied by electrode tabs protruding from the electrode plates and the volume occupied by a coupling part for connecting the electrode tabs and an electrode lead. However, these desired effects have not been achieved either.

Therefore, there is a high necessity for technology that is capable of improving the energy density of a battery configured to have a structure in which a plurality of electrode plates and a plurality of separators are stacked while maintaining the overall structure of the battery.

DISCLOSURE

Technical Problem

Therefore, the present invention has been made to solve the above problems and other technical problems that have yet to be resolved.

As a result of a variety of extensive and intensive studies and experiments to solve the problems as described above, the inventors of the present application have found that, in a case in which electrode tabs protruding from electrode plates of unit cells are electrically connected to an electrode lead via a tab-lead coupling part and the tab-lead coupling part is located in a space portion, as will be described hereinafter, the energy density of a secondary battery is considerably improved. The present invention has been completed based on these findings.

Technical Solution

In accordance with one aspect of the present invention, the above and other objects can be accomplished by the provision of an electrode assembly including a plurality of unit cells arranged in a height direction on the basis of a plane, at least two of the unit cells having different planar sizes, and a space portion defined by the difference in planar size between the arranged unit cells, wherein each of the unit cells includes at least one electrode plate, electrode tabs protruding from the electrode plates of the unit cells are electrically connected to an electrode lead via a tab-lead coupling part, and the tab-lead coupling part is located in the space portion.

In a conventional electrode assembly, the electrode tabs and the tab-lead coupling part protrude to occupy a predetermined volume, with the result that the capacity of a secondary battery is reduced.

In the electrode assembly according to the present invention, on the other hand, the electrode tabs and the tab-lead coupling part, which reduce the capacity of the secondary battery, are located in the space portion, which is a kind of dead space, whereby the energy density of the secondary battery is considerably improved.

In a concrete example, the electrode tabs may include positive electrode tabs and negative electrode tabs, and electrode tabs having the same polarity may be electrically connected to one electrode lead.

Alternatively, electrode tabs having the same polarity may be separated from each other, and may be electrically connected to different electrode leads. In this case, however, the connection between the electrode tabs and the electrode leads may be further complicated, and the volume occupied by the tab-lead coupling part may be further increased, which is not efficient.

In addition, in order to more easily achieve electrical connection between the electrode tabs and the electrode lead and to simplify the manufacturing process, the electrode tabs having the same polarity may protrude in the same direction on the base of the plane.

The space portion of the electrode assembly may be located outside a unit cell having a relatively small planar size, and may be located in a direction in which the electrode tabs protrude.

In a case in which the space portion of the electrode assembly is located outside the unit cell having the relatively small planar size, as described above, a portion of the secondary battery, which may be a dead space, is utilized, whereby the energy density of the secondary battery is considerably improved.

In a case in which the space portion of the electrode assembly is located outside a unit cell having a relatively large planar size, on the other hand, it is difficult to utilize the dead space, and additional space is used to position the tab-lead coupling part. As a result, the increase in energy efficiency is insignificant.

In a concrete example, the space portion may be defined by the unaligned arrangement of ends of the unit cells located in the direction in which the electrode tabs protrude.

In an electrode assembly including a plurality of unit cells arranged in a height direction on the basis of a plane, at least two of the unit cells having different planar sizes, i.e. a step-shaped electrode assembly, the unit cells are arranged such that the ends of the unit cells located in the direction in which the electrode tabs protrude are aligned with each other. As a result, it is possible to easily couple the electrode tabs to the electrode lead. However, it is not possible to improve energy density through the use of the space portion.

According to the present invention, on the other hand, the space portion is defined by the unaligned arrangement of ends of the unit cells located in the direction in which the electrode tabs protrude, and the tab-lead coupling part is located in the space portion, which deviates from general technical sense. Consequently, it is possible to considerably improve energy density while easily achieving coupling between the electrode tabs and the electrode lead.

In a concrete example, directions in which the positive electrode tabs and the negative electrode tabs protrude may be the same or different from each other on the base of the plane as long as the electrode tabs having the same polarity protrude in the same direction on the base of the plane.

Specifically, the positive electrode tabs and the negative electrode tabs may protrude in the same direction on the base of the plane. Alternatively, the positive electrode tabs may protrude in one direction of the electrode assembly, and the negative electrode tabs may protrude in the direction opposite to the direction in which the positive electrode tabs protrude such that the negative electrode tabs are opposite to the positive electrode tabs.

Meanwhile, in order to reduce the volume occupied by the electrode tabs, the tab-lead coupling part may be located in the space portion in a state in which at least some of the electrode tabs are bent.

The unit cells may be configured to have various shapes based on the structure of a device that requires the electrode assembly. Specifically, the unit cells may be different from each other in at least one selected from among the thickness, length, and width thereof, and each of unit cells may have a polygonal planar shape or a circular planar shape.

In addition, the electrode lead may extend parallel to the electrode plates.

Since the electrode assembly according to the present invention is generally similar in structure to a conventional electrode assembly, as described above, it is possible to manufacture a secondary battery characterized by improved energy density without greatly modifying existing manufacturing facilities.

The structure of each of the unit cells is not particularly restricted so long as each of the unit cells includes one or more electrode plates and separators. Each of the unit cells may include at least one electrode plate and at least one separator.

Each of the unit cells may include two or more electrode plates and separators, and the electrode plates and the separators may be alternately arranged.

In addition, each of the unit cells may be configured such that the electrodes located at opposite surfaces of each of the unit cells have the same polarity or such that the electrodes located at the opposite surfaces of each of the unit cells have different polarities.

Specifically, each of the unit cells may be configured, for example, to have an electrode plate/separator structure, a separator/electrode plate/separator structure, a first electrode plate/separator/second electrode plate structure, a separator/first electrode plate/separator/second electrode plate structure, a first electrode plate/separator/second electrode plate/separator/first electrode plate structure, a separator/first electrode plate/separator/second electrode plate/separator/first electrode plate structure, or a separator/first electrode plate/separator/second electrode plate/separator/first electrode plate/separator structure. Alternatively, the electrode plates and the separators may be arranged in manners similar to the above-specified ones.

In a concrete example, the separators may have larger sizes than the electrode plates, and the electrode tabs may be bent toward the tab-lead coupling part in a state in which the electrode tabs do not contact the ends of the electrode plates due to separator surplus parts that extend longer than the electrode plates.

Specifically, the separator surplus parts may be bent toward the tab-lead coupling part together with the electrode tabs such that at least some of the electrode tabs are bent in tight contact with the outer circumference surface of the electrode assembly.

That is, even when the electrode tabs are bent in a specific direction due to the structure of the separators, the electrode tabs are prevented from contacting the electrode plates having different polarities. Consequently, it is possible to effectively prevent the occurrence of an internal short circuit, thereby improving the stability of the secondary battery.

In addition, the electrode tabs may be brought into tighter contact with the electrode assembly due to the structure of the separators, thereby further improving the energy density of the secondary battery.

Meanwhile, the electrode plate located at the outer surface of the electrode assembly that is brought into tight contact with the tab-lead coupling part in the space portion may have a different polarity from the tab-lead coupling part. In order to improve the safety of the secondary battery, it is necessary to insulate the tab-lead coupling part from the electrode plate located at the outer surface of the electrode assembly. In a concrete example, the tab-lead coupling part may be brought into tight contact with the outer surface of the electrode assembly in a state in which an insulating film is interposed between the tab-lead coupling part and the outer surface of the electrode assembly.

The insulating film and the separators may be made of the same material or different materials. In a case in which the insulating film and the separators are made of the same material, the separators used during the manufacture of the electrode assembly may be used without change, thereby improving process efficiency. In a case in which the insulating film and the separators are made of different materials, on the other hand, the mechanical strength of the outermost part of the electrode assembly may be further increased, or the insulation of the electrode assembly may be further improved, thereby improving the safety of the secondary battery.

In a concrete example, the tab-lead coupling part may be fixed at a desired position using a fixing member. Specifically, the fixing member may be an adhesive tape.

If the electrode lead deviates from the desired position when the electrode assembly is inserted into the battery case after the tab-lead coupling part is located in the space portion of the electrode assembly, the external appearance of the secondary battery may be deteriorated. When the tab-lead coupling part is fixed using the fixing member, therefore, it is possible to reduce a defect rate of the secondary battery.

In addition, the tab-lead coupling part is fixed by welding. As a result, the tab-lead coupling part has lower resistance to external impact than other regions of the electrode assembly. For this reason, the tab-lead coupling part may be covered using a fixing member in order to reinforce the tab-lead coupling part.

In a concrete example, the electrode tabs may have the same length or different lengths. Specifically, the electrode tabs may have different lengths, and the lengths of the electrode tabs may be relatively increased based on the increase in distance between the space portion and the electrode plates.

More specifically, at the tab-lead coupling part, the ends of the electrode tabs may be substantially aligned with each other.

In a case in which the electrode tabs have the same length, it is possible to manufacture the electrode assembly using the same kind of electrode plates. In this case, processing efficiency is higher than in a case in which different kinds of electrode plates are used.

If excessively long electrode tabs are used, however, energy density may be reduced, since the electrode tabs occupy space inside the secondary battery.

In a case in which the electrode tabs have different lengths, on the other hand, it is possible to manufacture the electrode assembly using different kinds of electrode plates, thereby improving energy density. However, process efficiency may be reduced since different kinds of electrode plates are used.

Consequently, electrode plates having electrode tabs, the lengths of which are the same, may be used during the manufacture of the electrode assembly, thereby improving process efficiency, and then the electrode tabs may be cut during the manufacture of the electrode assembly such that ends of the electrode tabs are substantially aligned with each other, thereby improving energy density.

Each of the electrode tabs may have a length of 5 mm to 25 mm, preferably 6 mm to 23 mm, and the tab-lead coupling part may have a length of 0.5 mm to 5 mm, preferably 1 mm to 4 mm. However, the present invention is not limited thereto.

The structure of the electrode assembly is not particularly restricted. For example, the electrode assembly may be a stacked type electrode assembly, a laminated/stacked type electrode assembly, a stacked/folded type electrode assembly, or a jelly-roll type electrode assembly.

In accordance with another aspect of the present invention, there is provided a method of manufacturing an electrode assembly including (a) arranging at least two unit cells having different planar sizes in a height direction on the basis of a plane such that a space portion is defined by the difference in planar size between the arranged unit cells, (b) at least partially bending electrode tabs of the unit cells toward the space portion, (c) electrically connecting the electrode tabs to an electrode lead to form a tab-lead coupling part, and (d) bending the electrode tabs such that the tab-lead coupling part is located in the space portion.

In a concrete example, the method may further include (b-1) cutting the electrode tabs such that ends of the electrode tabs are substantially aligned with each other, step (b-1) being performed after step (b).

In a case in which step (b-1) is included, electrode plates having electrode tabs, the lengths of which are the same, may be used during the manufacture of the electrode assembly, thereby improving process efficiency, and then the electrode tabs may be cut during the manufacture of the electrode assembly such that ends of the electrode tabs are substantially aligned with each other, thereby improving energy density.

In accordance with another aspect of the present invention, there is provided a battery cell including the electrode assembly received in a battery case together with an electrolytic solution in a sealed state.

In a concrete example, the battery cell may be configured to have a structure in which the end of an electrode lead is exposed outward from the battery case, and electrode tabs and a tab-lead coupling part are located in the battery case.

In the battery cell according to the present invention, the electrode tabs and the tab-lead coupling part are located in the battery case. Consequently, it is possible to utilize the space inside the battery cell, thereby considerably improving energy density. In a case in which technology for utilizing the space outside the battery cell to improve energy density is further applied, it is possible to considerably improve the energy density of the battery cell through the use of both the space inside the battery cell and the space outside the battery cell.

In a concrete example, the battery case may be a pouch-shaped battery case made of a laminate sheet including a metal layer and a resin layer.

The laminate sheet may be an aluminum laminate sheet. Specifically, the laminate sheet may be configured to have a structure in which an outer resin layer exhibiting high durability is attached to one major surface (the outer surface) of a metal blocking layer and a resin sealant layer exhibiting a high thermal bonding property is attached to the other major surface (the inner surface) of the metal blocking layer.

It is required for the outer resin layer to exhibit high resistance to external environment. Consequently, it is required for the outer resin layer to exhibit more than predetermined tensile strength and weather resistance. For this reason, the outer resin layer may be made of a polymer resin, such as polyethylene terephthalate (PET) or oriented nylon film.

It is required for the metal blocking layer to have a function of increasing the strength of the battery case in addition to a function of preventing the introduction or leakage of foreign matter, such as gas or moisture. To this end, the metal blocking layer may be made of, for example, aluminum or an aluminum alloy.

The resin sealant layer may be made of a polyolefin resin which exhibits a high thermal bonding property (thermal adhesive property) and a low hygroscopic property, which is necessary to restrain permeation of an electrolytic solution, and is not expanded or is not corroded by the electrolytic solution. In a concrete example, the resin sealant layer may be made of cast polypropylene (CPP).

In general, polyolefin, particularly polypropylene, has low adhesion with metal. For this reason, an adhesion layer may be further disposed between the resin sealant layer and the metal blocking layer so as to improve adhesion between the resin sealant layer and the metal blocking layer and to improve blocking characteristics. The adhesion layer may be made of, for example, urethane, acryl, or thermoplastic elastomer, to which, however, the material for the adhesion layer is not limited.

The region of the battery case in which the tab-lead coupling part is located may relatively protrude.

At least a portion of the outer surface of the electrode assembly may be formed to have a step, and the battery case may have a step corresponding to the shape of the outer surface of the electrode assembly.

Meanwhile, the battery cell may be a lithium secondary battery, a lithium ion battery, or a lithium ion polymer battery.

The term "electrode plate" is a common name for a positive electrode or a negative electrode. Hereinafter, other components of the secondary battery will be described.

The positive electrode may be manufactured, for example, by applying a positive electrode mixture of a positive electrode active material, a conductive agent, and a binder to a positive electrode current collector. A filler may be further added to the positive electrode mixture as needed.

In general, the positive electrode current collector has a thickness of 3 to 300 μm. The positive electrode current collector is not particularly restricted so long as the positive electrode current collector exhibits high conductivity while the positive electrode current collector does not induce any chemical change in a battery to which the positive electrode current collector is applied. For example, the positive electrode current collector may be made of stainless steel, aluminum, nickel, or titanium. Alternatively, the positive electrode current collector may be made of aluminum or stainless steel, the surface of which is treated with carbon, nickel, titanium, or silver. Specifically, the positive electrode current collector may be made of aluminum. The positive electrode current collector may have a micro-scale uneven pattern formed at the surface thereof so as to increase the adhesive force of the positive electrode active material. The positive electrode current collector may be configured in various forms, such as a film, a sheet, a foil, a net, a porous body, a foam body, and a non-woven fabric body.

The positive electrode active material may be, but is not limited to, a layered compound, such as a lithium cobalt oxide ($LiCoO_2$) or a lithium nickel oxide ($LiNiO_2$), or a compound replaced by one or more transition metals; a lithium manganese oxide represented by a chemical formula $Li_{1+x}Mn_{2-x}O_4$ (where x=0 to 0.33) or a lithium manganese oxide, such as $LiMnO_3$, $LiMn_2O_3$, or $LiMnO_2$; a lithium copper oxide ($Li_2CuO_2$); a vanadium oxide, such as $LiV_3O_8$, $LiFe_3O_4$, $V_2O_5$, or $Cu_2V_2O_7$; an Ni-sited lithium nickel oxide represented by a chemical formula $LiNi_{1-x}M_xO_2$ (where M=Co, Mn, Al, Cu, Fe, Mg, B, or Ga, and x=0.01 to 0.3); a lithium manganese composite oxide represented by a chemical formula $LiMn_{2-x}M_xO_2$ (where M=Co, Ni, Fe, Cr, Zn, or Ta, and x=0.01 to 0.1) or a chemical formula $Li_2Mn_3MO_8$ (where M=Fe, Co, Ni, Cu, or Zn); $LiMn_2O_4$ having Li of a chemical formula partially replaced by alkaline earth metal ions; a disulfide compound; or $Fe_2(MoO_4)_3$.

The conductive agent is generally added so that the conductive agent has 1 to 30 weight % based on the total weight of the positive electrode mixture including the positive electrode active material. The conductive agent is not particularly restricted so long as the conductive agent exhibits high conductivity while the conductive agent does not induce any chemical change in a battery to which the conductive agent is applied. For example, graphite, such as natural graphite or artificial graphite; carbon black, such as carbon black, acetylene black, Ketjen black, channel black, furnace black, lamp black, or summer black; conductive fiber, such as carbon fiber or metallic fiber; metallic powder, such as carbon fluoride powder, aluminum powder, or nickel powder; conductive whisker, such as zinc oxide or potassium titanate; a conductive metal oxide, such as titanium oxide; or polyphenylene derivatives may be used as the conductive agent.

The binder is a component assisting in binding between the active material and conductive agent and in binding with the current collector. The binder is generally added in an amount of 1 to 30 weight % based on the total weight of the compound including the positive electrode active material. As examples of the binder, there may be used polyvinylidene fluoride, polyvinyl alcohol, carboxymethylcellulose (CMC), starch, hydroxypropylcellulose, regenerated cellulose, polyvinyl pyrollidone, tetrafluoroethylene, polyethylene, polypropylene, ethylene-propylene-diene terpolymer (EPDM), sulfonated EPDM, styrene butadiene rubber, fluoro rubber, and various copolymers.

The filler is an optional component used to inhibit expansion of the positive electrode. There is no particular limit to the filler so long as the filler does not cause chemical changes in a battery to which the filler is applied, and is made of a fibrous material. As examples of the filler, there may be used olefin polymers, such as polyethylene and polypropylene; and fibrous materials, such as glass fiber and carbon fiber.

On the other hand, the negative electrode is prepared by applying a negative electrode mixture of a negative electrode active material, a conductive agent, and a binder to a negative electrode current collector. A filler may be selectively added to the negative electrode mixture.

The negative electrode current collector is not particularly restricted so long as the negative electrode current collector exhibits high conductivity while the negative electrode current collector does not induce any chemical change in a battery to which the negative electrode current collector is applied. For example, the negative electrode current collector may be made of copper, stainless steel, aluminum, nickel, titanium, or plastic carbon. Alternatively, the negative electrode current collector may be made of copper or stainless steel, the surface of which is treated with carbon, nickel, titanium, or silver, or an aluminum-cadmium alloy. In the same manner as in the positive electrode current collector, the negative electrode current collector may have a microscale uneven pattern formed at the surface thereof so as to increase adhesive force of the negative electrode active material. The negative electrode current collector may be configured in various forms, such as a film, a sheet, a foil, a net, a porous body, a foam body, and a non-woven fabric body.

In the present invention, negative electrode current collectors may have the same thickness within a range of 3 to 300 μm. According to circumstances, however, the negative electrode current collectors may have different thicknesses.

As the negative electrode active material, for example, there may be used carbon, such as non-graphitizing carbon or a graphite-based carbon; a metal composite oxide, such as $Li_xFe_2O_3$ (0≤x≤1), $Li_xWO_2$ (0≤x≤1), $Sn_xMe_{1-x}Me'_yO_z$ (Me: Mn, Fe, Pb, Ge; Me': Al, B, P, Si, Group 1, 2 and 3 elements of the periodic table, halogen; 0≤x≤1; 1≤y≤3; 1≤z≤8); lithium metal; lithium alloy; silicon-based alloy; tin-based alloy; a metal oxide, such as SnO, $SnO_2$, PbO, $PbO_2$, $Pb_2O_3$, $Pb_3O_4$, $Sb_2O_3$, $Sb_2O_4$, $Sb_2O_5$, GeO, $GeO_2$, $Bi_2O_3$, $Bi_2O_4$, or $Bi_2O_5$; conductive polymer, such as polyacetylene; or a Li—Co—Ni based material.

The separator is disposed between the positive electrode and the negative electrode. As the separator, for example, an insulative thin film exhibiting high ion permeability and high mechanical strength may be used. The separator generally has a pore diameter of 0.01 to 10 μm and a thickness of 5 to 30 μm. As the material for the separator, for example, a sheet or non-woven fabric made of olefin polymer, such as polypropylene, which exhibits chemical resistance and hydrophobicity, glass fiber, or polyethylene is used. In a case in which a solid electrolyte, such as polymer, is used as an electrolyte, the solid electrolyte may function as the separator.

The electrolytic solution may be a non-aqueous electrolyte containing lithium salt. The non-aqueous electrolyte containing lithium salt is composed of a non-aqueous electrolyte and lithium salt. A non-aqueous organic solvent, an organic solid electrolyte, or an inorganic solid electrolyte may be used as the non-aqueous electrolyte. However, the present invention is not limited thereto.

As examples of the non-aqueous organic solvent, mention may be made of non-protic organic solvents, such as N-methyl-2-pyrollidinone, propylene carbonate, ethylene carbonate, butylene carbonate, dimethyl carbonate, diethyl carbonate, gamma-butyro lactone, 1,2-dimethoxy ethane, tetrahydroxyfuran, 2-methyl tetrahydrofuran, dimethylsulfoxide, 1,3-dioxolane, formamide, dimethylformamide, dioxolane, acetonitrile, nitromethane, methyl formate, methyl acetate, phosphoric acid triester, trimethoxy methane, dioxolane derivatives, sulfolane, methyl sulfolane, 1,3-dimethyl-2-imidazolidinone, propylene carbonate derivatives, tetrahydrofuran derivatives, ether, methyl propionate, and ethyl propionate.

As examples of the organic solid electrolyte, mention may be made of polyethylene derivatives, polyethylene oxide derivatives, polypropylene oxide derivatives, phosphoric acid ester polymers, poly agitation lysine, polyester sulfide, polyvinyl alcohols, polyvinylidene fluoride, and polymers containing ionic dissociation groups.

As examples of the inorganic solid electrolyte, mention may be made of nitrides, halides, and sulphates of lithium (Li), such as $Li_3N$, LiI, $Li_5NI_2$, $Li_3N$—LiI—LiOH, $LiSiO_4$, $LiSiO_4$—LiI—LiOH, $Li_2SiS_3$, $Li_4SiO_4$, $Li_4SiO_4$—LiI—LiOH, and $Li_3PO_4$—$Li_2S$—$SiS_2$.

The lithium salt is a material that is readily soluble in the above-mentioned non-aqueous electrolyte, and may include, for example, LiCl, LiBr, LiI, $LiClO_4$, $LiBF_4$, $LiB_{10}Cl_{10}$, $LiPF_6$, $LiCF_3SO_3$, $LiCF_3CO_2$, $LiAsF_6$, $LiSbF_6$, $LiAlCl_4$, $CH_3SO_3Li$, $(CF_3SO_2)_2NLi$, chloroborane lithium, lower aliphatic carboxylic acid lithium, lithium tetraphenyl borate, and imide.

In addition, in order to improve charge and discharge characteristics and flame retardancy, for example, pyridine, triethylphosphite, triethanolamine, cyclic ether, ethylenediamine, n-glyme, hexaphosphoric triamide, nitrobenzene derivatives, sulfur, quinone imine dyes, N-substituted oxazolidinone, N,N-substituted imidazolidine, ethylene glycol dialkyl ether, ammonium salts, pyrrole, 2-methoxy ethanol, aluminum trichloride, or the like may be added to the non-aqueous electrolyte. According to circumstances, in order to impart incombustibility, the non-aqueous electrolyte may further include halogen-containing solvents, such as carbon tetrachloride and ethylene trifluoride. Furthermore, in order to improve high-temperature storage characteristics, the non-aqueous electrolyte may further include carbon dioxide gas. In addition, fluoro-ethylene carbonate (FEC) and propene sultone (PRS) may be further included.

In a concrete example, lithium salt, such as $LiPF_6$, $LiClO_4$, $LiBF_4$, or $LiN(SO_2CF_3)_2$, may be added to a mixed solvent of cyclic carbonate, such as EC or PC, which is a high dielectric solvent, and linear carbonate, such as DEC, DMC, or EMC, which is a low viscosity solvent, to prepare a non-aqueous electrolyte containing lithium salt.

In accordance with other aspects of the present invention, there are provided a battery pack including the battery cell as a unit cell and a device including the battery pack as a power source.

For example, the device may be a laptop computer, a netbook computer, a tablet PC, a wearable electronic device, a power tool, an electric vehicle (EV), a hybrid electric vehicle (HEV), a plug-in hybrid electric vehicle (PHEV), an electric bicycle (E-bike), an electric scooter (E-scooter), an electric golf cart, or a power storage system. However, the present invention is not limited thereto.

The structure and manufacturing method of the device are well known in the art to which the present invention pertains, and a detailed description thereof will be omitted.

BRIEF DESCRIPTION OF DRAWINGS

The above and other objects, features and other advantages of the present invention will be more clearly understood from the following detailed description taken in conjunction with the accompanying drawings, in which:

FIG. 1 is a perspective view typically showing an electrode assembly and a battery case of a general battery cell;

FIG. 2 is a perspective view typically showing a battery cell having an electrode assembly, which includes two unit cells having different planar sizes, mounted therein;

FIG. 3 is a vertical sectional view typically showing the electrode assembly included in the battery cell of FIG. 2;

FIG. 4 is a vertical sectional view typically showing the battery cell of FIG. 2;

FIG. 5 is a vertical sectional view typically showing an electrode assembly according to an embodiment of the present invention;

FIG. 6 is a vertical sectional view typically showing a battery cell having the electrode assembly of FIG. 5 received in a battery case in a sealed state; and FIGS. 7 and 8 are typical views showing a series of processes for manufacturing the electrode assembly of FIG. 5.

BEST MODE

Now, exemplary embodiments of the present invention will be described in detail with reference to the accompanying drawings. It should be noted, however, that the scope of the present invention is not limited by the illustrated embodiments.

FIG. 1 is a perspective view typically showing an electrode assembly and a battery case of a general battery cell.

Referring to FIG. 1, an electrode assembly 10 includes a stack 11, electrode tabs 12 and 13, and electrode leads 16 and 17, and a battery case 20 includes an electrode assembly receiving part 21, an outer coating layer 22 and an inner sealant layer constituting a laminate sheet, and a cover 24.

Specifically, the electrode assembly 10 includes a plate-shaped stack 11 configured by repeatedly stacking two or more structures, each of which includes a positive electrode, a negative electrode, and a separator interposed between the positive electrode and the negative electrode. The electrode tabs 12 and 13, which are formed at positive electrode current collectors and negative electrode current collectors, respectively, protrude from one relatively narrow side of the electrode assembly 10.

The electrode tabs 12 and 13, each of which has the same polarity, are grouped. The electrode tabs 12 and 13 are electrically connected to the electrode leads 16 and 17, respectively.

The battery case 20 is a pouch-shaped case made of a laminate sheet including an outer coating layer 22, made of a weather resistance polymer, an inner sealant layer 23, made of a thermally fusible polymer, and a barrier layer interposed between the outer coating layer 22 and the inner sealant layer 23, the barrier layer being made of aluminum or an aluminum alloy.

The battery case 20 is provided with an electrode assembly receiving part 21, in which the electrode assembly 10 is received together with an electrolytic solution. The electrode assembly receiving part 21 is covered by the cover 24 in a state in which the electrode assembly 10 and the electrolytic solution are received in the electrode assembly receiving part 21, and then the inner sealant layer 23 is thermally fused, whereby one independent battery cell is manufactured.

FIG. 2 is a perspective view typically showing a battery cell having an electrode assembly, which includes two unit cells having different planar sizes, mounted therein, FIG. 3 is a vertical sectional view typically showing the electrode assembly included in the battery cell of FIG. 2, and FIG. 4 is a vertical sectional view typically showing the battery cell of FIG. 2.

Referring first to FIG. 2, a battery cell 101 includes two unit cells 110 and 120 having different planar sizes, and two electrode leads 130 are formed at the left side of the unit cell 110 such that the electrode leads 130 protrude outward from a battery case.

Specifically, the unit cell 120, which has a relatively small planar size, is stacked on the top surface of the unit cell 110, which has a relatively large planar size, on the basis of a plane. The unit cells 110 and 120 are received in the battery case in a state in which the unit cells 110 and 120 are stacked one above another.

In particular, the unit cells 110 and 120 are arranged such that the left ends of the unit cells 110 and 120, at which the electrode leads are located, are aligned with each other, but the right ends of the unit cells 110 and 120 are not aligned with each other.

Referring now to FIG. 3, an electrode assembly 100 includes two unit cells 110 and 120 having different planar sizes. The unit cell 110 includes three electrode plates 111 and four separators 115, and the unit cell 120 includes three electrode plates 121 and three separators 125.

Electrode tabs 140, protruding from the left sides of the respective electrode plates 111 and 121, are electrically connected to an electrode lead 130 via a tab-lead coupling part 131.

The electrode lead 130 is located further leftward than the electrode tabs 140, and the tab-lead coupling part 131 is located between the electrode lead 130 and the electrode tabs 140. The electrode tabs 140 are bent from the respective electrode plates 111 and 121 toward the tab-lead coupling part 131.

Referring to FIG. 4, the battery cell 101 includes an electrode assembly, which includes two unit cells 110 and 120, and a battery case 150, in which the electrode assembly is received.

The unit cells 110 and 120 are received in the battery case 150 in a state in which the unit cells 110 and 120 are stacked, and the left end of the electrode lead 130 is exposed outward from the battery case 150.

The electrode tabs 140 and the tab-lead coupling part 131 are located in the battery case 150. The electrode tabs 140 and the tab-lead coupling part 131 occupy a predetermined volume V1 in the battery case 150, thereby reducing the capacity of the battery cell 101.

FIG. 5 is a vertical sectional view typically showing an electrode assembly according to an embodiment of the present invention.

Referring to FIG. 5 together with FIG. 3, an electrode assembly 200 includes two unit cells 210 and 220 having different planar sizes, and a space portion 260 defined by the difference in planar size between the unit cells 210 and 220.

An electrode lead 230 extends leftward from electrode plates 211 and 221 in parallel to the electrode plates 211 and 221. The unit cells 210 and 220 have the same thickness and width. However, the unit cells 210 and 220 have different lengths.

The unit cells 210 and 220 include three electrode plates 211 and 221, respectively. Electrode tabs 240 and 241, which protrude leftward from the electrode plates 211 and 221, respectively, are electrically connected to the electrode lead 230 via a tab-lead coupling part 231. The tab-lead coupling part 231 is located in the space portion 260.

The space portion 260 is located outside the unit cell 220, which has a relatively small planar size. Specifically, the space portion 260 is located at the left side of the unit cell 220, from which the electrode tabs 241 protrude.

The space portion 260 is defined by the unaligned arrangement of the left ends of the unit cells 210 and 220, from which the electrode tabs 241 protrude. In particular, as compared with the electrode assembly 100 of FIG. 3, the electrode assembly 200 according to the embodiment of the present invention is different from the electrode assembly 100, in which the left ends of the unit cells 110 and 120 are aligned with each other.

Conventionally, locating the space portion 260 at the side of the battery cell from which the electrode tabs 241 protrude has been avoided for the reason that the electrode tabs 241 must be complicatedly bent, whereby process efficiency is reduced.

However, according to the present invention, it has been found that, when the tab-lead coupling part 231 is located in the space portion 260, unlike the conventional idea, efficiency is high in terms of spatial utilization, it is not necessary to unnecessarily extend the electrode tabs 240 and 241, and it is simplified to locate the tab-lead coupling part 231, which are more effective than the conventional structure.

Meanwhile, separators 215 and 225 are larger than the electrode plates 211 and 221. The electrode tabs 240 and 241 are bent toward the tab-lead coupling part 231 in a state in which the electrode tabs 240 and 241 do not contact the ends of the electrode plates 211 and 221 due to separator surplus parts 216 extending longer than the electrode plates 211 and 221.

In the above-described structure, the electrode tabs 240 and 241 are prevented from contacting electrode plates 211 and 221 having different polarities even when the electrode tabs 240 and 241 are bent in a specific direction. Consequently, it is possible to effectively prevent the occurrence of an internal short circuit, thereby improving the stability of a secondary battery. In addition, the electrode tabs 240 and 241 are brought into tighter contact with the electrode assembly 200 due to the structures of the separators 215 and 225, thereby further improving the energy density of the secondary battery.

The tab-lead coupling part 231 is brought into tight contact with the outer surface of the electrode assembly 200 in a state in which an insulating film 213 is interposed between the tab-lead coupling part 231 and the outer surface of the electrode assembly 200, whereby it is possible to insulate the outer surface of the electrode assembly 200 from the tab-lead coupling part 231.

FIG. 6 is a vertical sectional view typically showing a battery cell having the electrode assembly of FIG. 5 received in a battery case in a sealed state.

Referring to FIG. 6 together with FIG. 4, a battery cell 201 is configured such that the electrode tabs 240 and 241 are mounted in a battery case 250 in a state in which the electrode tabs 240 and 241 are connected to the electrode lead 230 via the tab-lead coupling part 231 and such that the left end of the electrode lead 230 is exposed outward from the battery case 250.

The electrode tabs 240 and 241 and the tab-lead coupling part 231 occupy a predetermined volume V2 in the battery cell 201, which is much less than the volume V1 that the electrode tabs 140 and the tab-lead coupling part 131 occupy in the battery cell 101.

The volume of the battery cell 201 according to the present invention is reduced approximately by the difference between V1 and V2 for a given battery capacity, whereby the energy density of the battery cell is improved.

On the assumption that a general battery cell used in the art to which the present invention pertains has a width of 100.0 mm, a length of 315.0 mm, and a thickness of 10.6 mm, the length is increased by 7.5 mm due to the tab-lead coupling part. When the present invention is applied to such a battery cell, the length is decreased by 7.5 mm, and the thickness of the region of the battery cell at which the tab-lead coupling part is located is increased by 0.9 mm.

According to the present invention, the tab-lead coupling part is located in the space portion, which is a kind of dead space. As a result, the increase in thickness does not affect the battery cell. It has been proved that the capacity of the battery cell according to the present invention is about 5% higher than the general battery cell.

FIGS. 7 and 8 are typical views showing a series of processes for manufacturing the electrode assembly of FIG. 5.

Referring to FIGS. 7 and 8, two unit cells 210 and 220 having different planar sizes are arranged in a height direction on the basis of a plane such that a space portion 260 is defined by the difference in planar size between the unit cells.

Electrode tabs 240 and 241 of the unit cells 210 and 220 are at least partially bent toward the space portion 260. Specifically, the electrode tabs 240 and 241 are bent such that the ends of the electrode tabs face the same direction. In particular, the electrode tabs 240 are bent once toward the space portion 260, and the electrode tabs 241 are bent once, twice, or three times such that the ends of the electrode tabs 241 are located near the ends of the electrode tabs 240 via the space portion 260.

At this time, the ends of the electrode tabs 240 and 241 after bending are not aligned with each other, since electrode plates having electrode tabs 240 and 241, the lengths of which are the same, are used. In order to prevent unnecessary waste of space due to surplus portions of the electrode tabs 240 and 241, the electrode tabs 240 and 241 are cut along a cutting line A such that the ends of the electrode tabs 240 and 241 are substantially aligned with each other.

As a result, the electrode tabs 240 and 241 have different lengths, and the lengths of the electrode tabs 240 and 241 are relatively increased based on the increase in distance between the space portion 260 and the electrode plates.

Subsequently, an electrode lead 230 is connected to the electrode tabs 240 and 241 by welding, in a state in which the end of the electrode lead 230 is aligned with the ends of the electrode tabs 240 and 241, to form a tab-lead coupling part 231, and then the electrode tabs 240 and 241 are bent in a direction indicated by an arrow B such that the tab-lead coupling part 231 is located in the space portion 260, whereby the electrode assembly 200 of FIG. 5 is manufactured.

Although the exemplary embodiments of the present invention have been disclosed for illustrative purposes, those skilled in the art will appreciate that various modifications, additions and substitutions are possible, without departing from the scope and spirit of the invention as disclosed in the accompanying claims.

INDUSTRIAL APPLICABILITY

As is apparent from the above description, an electrode assembly according to the present invention is configured such that a tab-lead coupling part is located in a space portion, which is a kind of dead space, thereby considerably improving the energy density of a secondary battery.

In addition, it is possible to manufacture a secondary battery characterized by improved energy density without greatly modifying existing manufacturing facilities.

The invention claimed is:

1. An electrode assembly comprising:
a plurality of unit cells arranged in a height direction on a basis of a plane, at least two of the unit cells having different planar sizes, the at least two of the unit cells including a smaller unit cell and a larger unit cell; and
a space portion defined by a difference in planar size between the smaller unit cell and the larger unit cell, wherein each of the unit cells comprises at least one electrode plate, and electrode tabs protruding from the electrode plates of the unit cells are electrically connected to an electrode lead via a tab-lead coupling part, the space portion is defined by an unaligned arrangement of ends of the smaller unit cell and the larger unit cell and located outside the smaller unit cell in a direction in which the electrode tabs protrude, and all of the electrode tabs are electrically connected to the tab-lead coupling part at a single connection located in the space portion.

2. The electrode assembly according to claim 1, wherein the electrode tabs comprise positive electrode tabs and negative electrode tabs, and electrode tabs having the same polarity are electrically connected to one electrode lead.

3. The electrode assembly according to claim 2, wherein the electrode tabs having the same polarity protrude in the same direction on the basis of the plane.

4. The electrode assembly according to claim 2, wherein directions in which the positive electrode tabs and the negative electrode tabs protrude are the same or different from each other on the basis of the plane.

5. The electrode assembly according to claim 1, wherein the tab-lead coupling part is located in the space portion in a state in which at least some of the electrode tabs are bent.

6. The electrode assembly according to claim 1, wherein the electrode lead extends parallel to the electrode plates.

7. The electrode assembly according to claim 1, wherein the unit cells are different from each other in at least one selected from among a thickness, a length, and a width thereof.

8. The electrode assembly according to claim 1, wherein each of the unit cells comprises two or more electrode plates and separators, the electrode plates and the separators being alternately arranged.

9. The electrode assembly according to claim 8, wherein the separators have larger sizes than the electrode plates, and the electrode tabs are bent toward the tab-lead coupling part in a state in which the electrode tabs do not contact ends of the electrode plates due to separator surplus parts extending longer than the electrode plates.

10. The electrode assembly according to claim 9, wherein the separator surplus parts are bent toward the tab-lead coupling part together with the electrode tabs such that at least some of the electrode tabs are bent in tight contact with an outer circumference surface of the electrode assembly.

11. The electrode assembly according to claim 8, wherein each of the unit cells is configured such that the electrodes located at opposite surfaces of each of the unit cells have the same polarity or such that the electrodes located at the opposite surfaces of each of the unit cells have different polarities.

12. The electrode assembly according to claim 1, wherein the tab-lead coupling part is brought into tight contact with an outer surface of the electrode assembly in a state in which an insulating film is interposed between the tab-lead coupling part and the outer surface of the electrode assembly.

13. The electrode assembly according to claim 1, wherein the tab-lead coupling part is fixed at a desired position using a fixing member.

14. The electrode assembly according to claim 1, wherein the electrode tabs have the same length or different lengths.

15. The electrode assembly according to claim 14, wherein the electrode tabs have different lengths, and the lengths of the electrode tabs are relatively increased based on an increase in distance between the space portion and the electrode plates.

16. The electrode assembly according to claim 1, wherein the electrode assembly is a stacked type electrode assembly, a laminated/stacked type electrode assembly, or a stacked/folded type electrode assembly.

17. A battery cell comprising an electrode assembly according to claim 1 received in a battery case together with an electrolytic solution in a sealed state.

18. The battery cell according to claim 17, wherein an end of an electrode lead is exposed outward from the battery case, and electrode tabs and a tab-lead coupling part are located in the battery case.

19. The battery cell according to claim 18, wherein a region of the battery case in which the tab-lead coupling part is located relatively protrudes.

20. The battery cell according to claim 17, wherein at least a portion of an outer surface of the electrode assembly is formed to have a step, and the battery case has a step corresponding to a shape of the outer surface of the electrode assembly.

21. A battery pack comprising a battery cell according to claim 17 as a unit cell.

22. A device comprising a battery pack according to claim 21 as a power source.

23. A method of manufacturing an electrode assembly comprising:
(a) arranging at least two unit cells including a smaller unit cell and a larger unit cell having different planar sizes in a height direction on a basis of a plane such that a space portion is defined by a difference in planar size between the smaller unit cell and the larger unit cell, wherein each of the unit cells comprises at least one electrode plate;
(b) at least partially bending electrode tabs protruding from the electrode plates of the unit cells toward the space portion, the space portion defined by an unaligned arrangement of ends of the smaller unit cell and the larger unit cell and located outside the smaller unit cell in a direction in which the electrode tabs protrude;
(c) electrically connecting the electrode tabs to an electrode lead at a single connection to form a tab-lead coupling part; and
(d) bending all of the electrode tabs such that the tab-lead coupling part is located in the space portion.

24. The method according to claim 23, further comprising (b-1) cutting the electrode tabs such that ends of the electrode tabs are substantially aligned with each other, step (b-1) being performed after step (b).

25. An electrode assembly comprising:
a plurality of unit cells arranged in a height direction on a basis of a plane, at least two of the unit cells having different planar sizes, the at least two of the unit cells including a smaller unit cell and a larger unit cell; and
a space portion defined by a difference in planar size between the smaller unit cell and the larger unit cell, wherein each of the unit cells comprises at least one electrode plate, and all of the electrode tabs protruding from the electrode plates of the unit cells are electrically connected to an electrode lead at a single connection via a tab-lead coupling part, the space portion is defined by an unaligned arrangement of ends of the smaller unit cell and the larger unit cell and located outside the smaller unit cell in a direction in which the electrode tabs protrude, and the tab-lead coupling part is located in the space portion, and the lead is at least partially disposed within and extends from the space portion.

\* \* \* \* \*